(12) United States Patent
Cox

(10) Patent No.: US 12,472,794 B2
(45) Date of Patent: Nov. 18, 2025

(54) PNEUMATIC CONTROL FOR DYNAMIC ANTI-ROLL BAR LINK SYSTEM

(71) Applicant: Christopher Cox Creative, Park City, UT (US)

(72) Inventor: Christopher Paul Cox, Park City, UT (US)

(73) Assignee: Christopher Cox Creative, Park City, UT (US)

( * ) Notice: Subject to any disclaimer, the term of this patent is extended or adjusted under 35 U.S.C. 154(b) by 0 days.

(21) Appl. No.: 18/640,601

(22) Filed: Apr. 19, 2024

(65) Prior Publication Data

US 2025/0326269 A1 Oct. 23, 2025

(51) Int. Cl.
*B60G 17/015* (2006.01)
*B60G 17/08* (2006.01)
*B60G 21/055* (2006.01)

(52) U.S. Cl.
CPC ..... *B60G 21/0551* (2013.01); *B60G 17/0152* (2013.01); *B60G 17/08* (2013.01)

(58) Field of Classification Search
CPC ........... B60G 17/015; B60G 17/0152; B60G 17/016; B60G 17/017; B60G 17/027; B60G 17/04; B60G 17/052; B60G 17/0523; B60G 17/056; B60G 17/08; B60G 21/055; B60G 21/0551; B60G 2202/135
USPC .................................................. 280/124.106
See application file for complete search history.

(56) References Cited

U.S. PATENT DOCUMENTS

| | | | | |
|---|---|---|---|---|
| 4,827,416 A | * | 5/1989 | Kawagoe | B60G 17/016 280/5.513 |
| 8,672,337 B2 | * | 3/2014 | van der Knaap | B60G 17/0152 280/124.16 |
| 9,751,374 B2 | * | 9/2017 | Izak | B60G 17/0525 |
| 12,049,114 B2 | * | 7/2024 | Damiani | B60G 17/0152 |
| 2002/0189331 A1 | * | 12/2002 | Kutscher | B60G 17/0432 73/117.03 |

(Continued)

FOREIGN PATENT DOCUMENTS

| | | | |
|---|---|---|---|
| CN | 106274339 A | * | 1/2017 |
| CN | 108297642 A | * | 7/2018 |

(Continued)

*Primary Examiner* — Jason D Shanske
*Assistant Examiner* — Daniel M. Keck
(74) *Attorney, Agent, or Firm* — Christensen O'Connor Johnson Kindness PLLC

(57) ABSTRACT

A control unit for an anti-roll bar link system for a vehicle suspension is provided, and includes a manifold to selectively fluidly couple first and second anti-roll bar links to a reservoir. The manifold can include a cam positionable between at least first and second settings, with the second setting causing greater telescopic resistance within the anti-roll bar link assemblies than the first setting. The control unit can include various check assemblies configured to seal passageways of the manifold based on the position of the cam. When the cam is in the first setting, pressure entering the manifold from the first or second anti-roll bar link assembly causes the check members to permit fluid flow from the anti-roll bar link assemblies to the reservoir. When the cam is in the second setting, the first and second anti-roll bar link assemblies and the reservoir are in fluid communication with each other.

30 Claims, 12 Drawing Sheets

(56) References Cited

U.S. PATENT DOCUMENTS

| | | | | |
|---|---|---|---|---|
| 2006/0038370 | A1* | 2/2006 | Doerr | B60G 17/056 |
| | | | | 280/5.506 |
| 2012/0153581 | A1* | 6/2012 | Li | B60G 17/0565 |
| | | | | 296/180.1 |
| 2014/0319788 | A1* | 10/2014 | Gomann | B60G 21/106 |
| | | | | 280/5.508 |
| 2017/0361672 | A1* | 12/2017 | Ahmadian | B60G 17/019 |
| 2022/0194161 | A1* | 6/2022 | Negishi | B60G 21/0556 |
| 2022/0355638 | A1* | 11/2022 | Worley | B60G 21/0558 |

FOREIGN PATENT DOCUMENTS

| | | | | |
|---|---|---|---|---|
| DE | 10126458 | A1 * | 12/2002 | B60G 17/0432 |
| DE | 102010011433 | A1 * | 6/2011 | B60G 17/005 |

\* cited by examiner

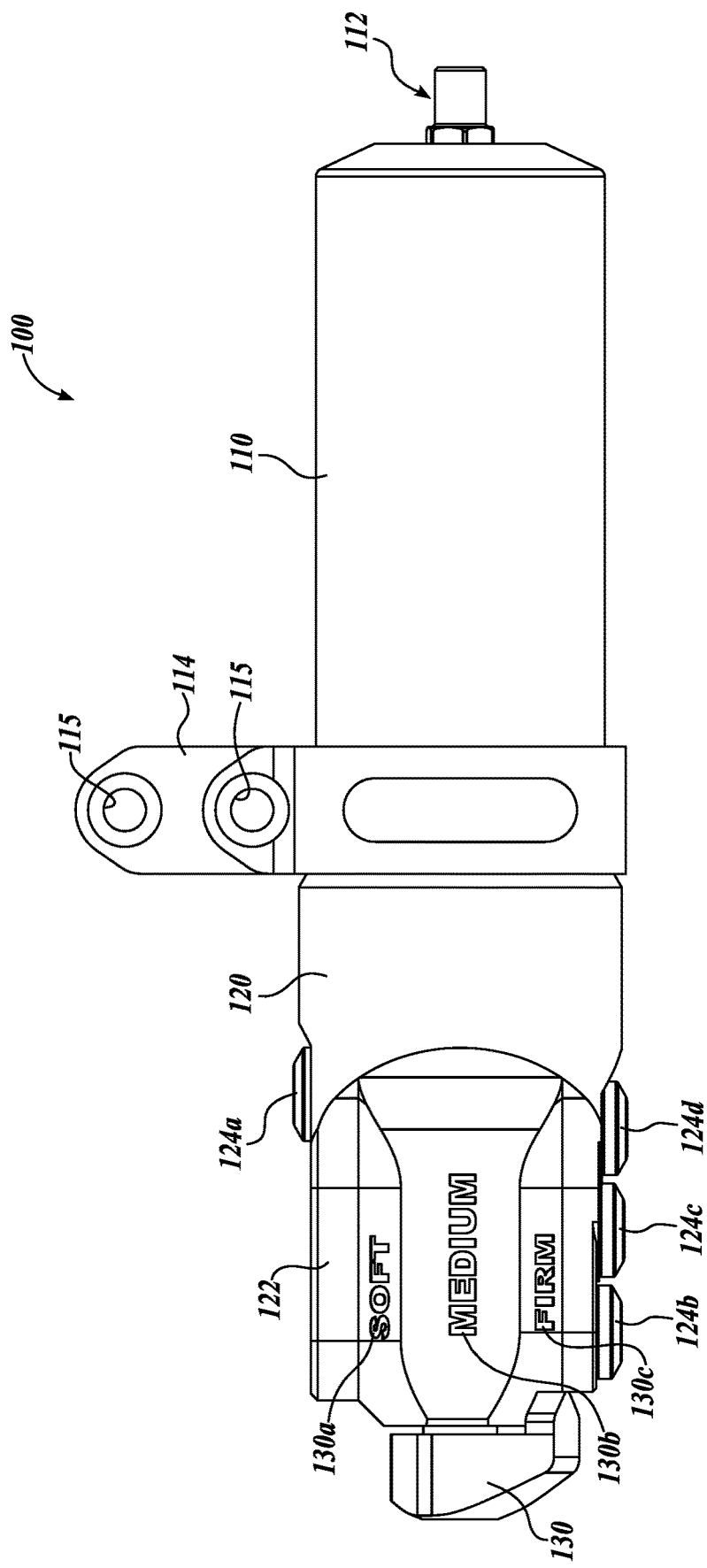

PNEUMATIC CONTROL FOR DYNAMIC ANTI-ROLL BAR LINK SYSTEM

BACKGROUND

An anti-roll bar (or anti-sway bar) is a common component in automotive suspensions to help reduce the body roll of a vehicle during cornering and other dynamic events causing suspension articulation. In general, an anti-roll bar is connected between the suspension assemblies of the left and right side of a vehicle to transfer an amount of articulation between the sides. In some configurations, both front and rear anti-roll bars are used on a four-wheel vehicle. The anti-roll bar provides compensation to the suspension on one side of the vehicle when the suspension on the other opposing side is articulated, e.g. the anti-roll bar acts to compress the left rear wheel suspension when the right rear wheel suspension is compressed through vehicle cornering and/or traveling over road irregularities. In this regard, the anti-roll bar can work to compress or extend the suspension of the opposite side of the vehicle to maintain the left and right side at similar heights.

In such anti-roll bar configurations, when one side of the suspension articulates, the anti-roll bar system imparts a torsional force through the bar and links to the other side of the connected suspension components. FIG. 1 shows a conventional anti-roll bar configuration having a bar 1, a rigid link 2 connecting the bar 1 to an axle 3, and a spring 4 providing counter-resistance to input compression forces. For clarity, other common components of the suspension and vehicle systems have been omitted. In these conventional configurations, the links connecting the anti-roll bar to the suspension components are generally rigid, such that the torsional forces of the bar are directly transferred to the suspension components during articulation. In some road configurations, such as rough or broken pavement, anti-roll bars can produce jarring side-to-side body motions (a "waddling" sensation), which increase in severity with the diameter and stiffness of the anti-roll bar. Further, excessive role stiffness, which is typically a result of overly aggressive anti-roll bar setups, can cause the inside wheels to lift off the ground during hard cornering and other suspension articulation maneuvering.

Disconnecting the anti-roll bars may be desirable in certain situations where high-articulation of the suspension is beneficial, such as off-road or when traversing rugged terrain. When the anti-roll bars are disconnected, or otherwise modified to have a reduced effect, the suspension at each corner of the vehicle can articulate to a larger extent since the forces acting on the wheel in any given corner of the vehicle are imparted into only the suspension components in that corner. During off-road use, such increased articulation may improve the ability of the vehicle to traverse rugged terrain; however, vehicles can become unstable with the anti-roll bars disconnected, and are typically only usable at low vehicle speeds due to undamped side-to-side motion.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIGS. 2A and 2B are side and perspective views, respectively, of a pneumatic control unit of a dynamic anti-roll bar link system configured in accordance with embodiments of the present disclosure;

DETAILED DESCRIPTION

Figure 1:
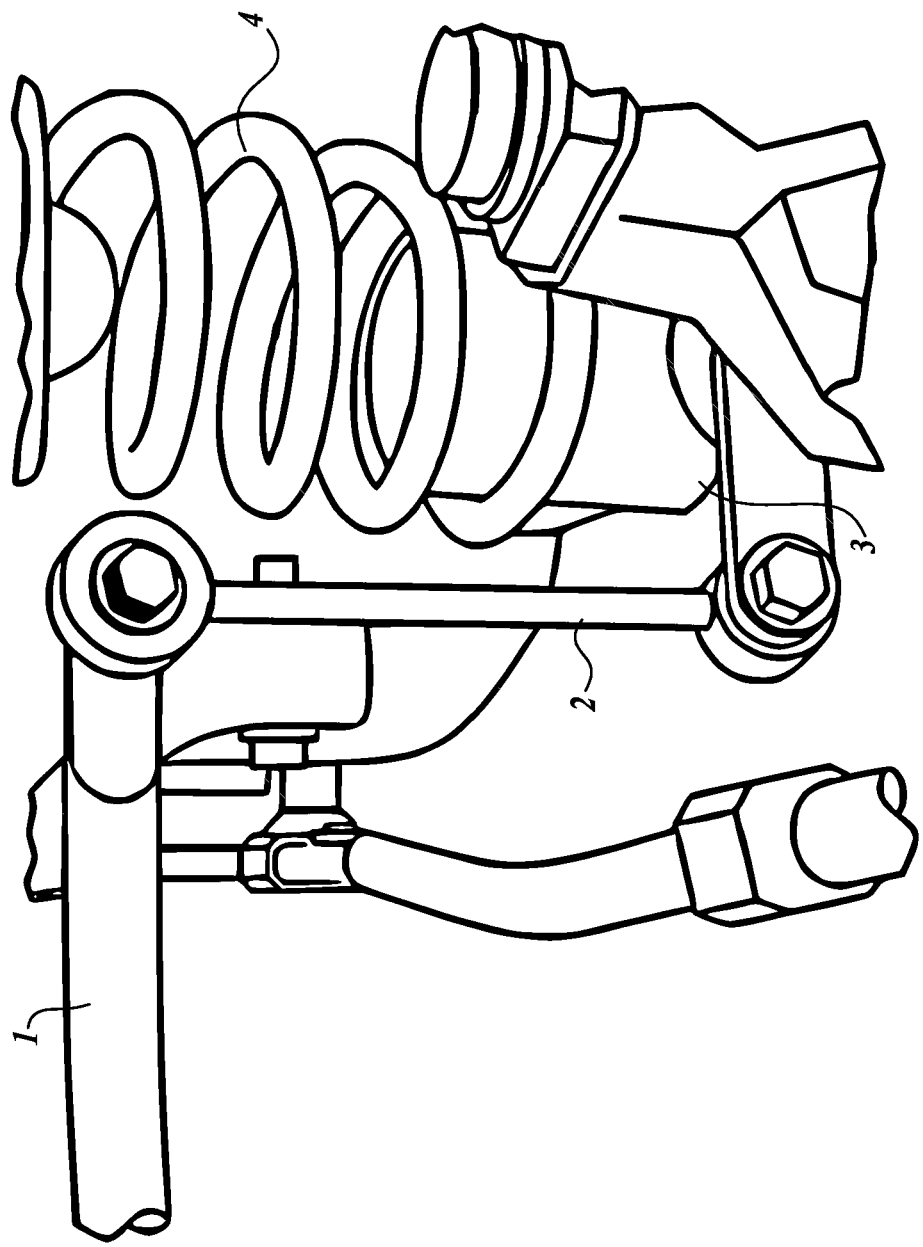
FIG. 1 is an environmental view of an anti-roll bar system configured in accordance with existing technology.

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

The following description provides several examples that relate to pneumatic (fluid) control of dynamic anti-roll bar link configurations used in automotive suspensions. The embodiments of the dynamic anti-roll bar system, generally having a pneumatic control unit operably coupled to dynamic anti-roll bar links, can include features to control the relative motion between the anti-roll bar and the vehicle suspension. Adjusting the telescopic resistance of the dynamic anti-roll bar links can, in the softest setting, provide the aforementioned advantages of a substantially disconnected anti-roll bar, by increased articulation of the suspension during off-road and other high-articulation uses, and in the intermediate and/or stiffest settings, provide increased vehicle stability for safe high-speed vehicle travel. In some embodiments, the dynamic anti-roll bar link system of the present disclosure is configured for use with original equipment anti-roll bars, such that a user can install and gain the advantages of the dynamic anti-roll bar link system without replacing various other suspension or anti-roll bar system components. As will be explained in greater detail below, the pneumatic control unit has selectable stiffness settings that affect the telescopic resistance of the anti-roll bar links to control the influence of the anti-roll bar on the dynamics of the vehicle. Although the embodiments are described herein in conjunction with pneumatic (e.g., air, gas, etc.) control of the dynamic anti-roll bar links, the present disclosure can be adapted for use as a hydraulic (e.g., oil, water, etc.) system, e.g., with hydraulic anti-roll bar links and a hydraulic control unit. As used herein, the term "in fluid communication" is intended to mean that the flow of fluids (gas or liquid) is permitted or selectively permitted.

Embodiments of the pneumatic control unit of the dynamic anti-roll bar link system can include various selectable settings for adjusting the telescopic resistance of the dynamic anti-roll bar links, including: (1) a firmest setting, where the dynamic anti-roll bar links are substantially rigid and permit only a minimal amount of relative movement between the anti-roll bar and the suspension components; (2) a softest setting, where the dynamic anti-roll bar links have low telescopic resistance to permit relative movement between the anti-roll bar and the suspension components; and (3) one or more intermediate settings, where the dynamic anti-roll bar links have varying levels of telescopic resistance to control the degree influence of the anti-roll bar on the dynamics of the vehicle. In some embodiments, the control unit of the dynamic anti-roll bar link system can be valve having an open position, corresponding to a softer setting, and a closed position, corresponding to a firmer setting.

In the illustrated embodiments described herein, the pneumatic control unit of the dynamic anti-roll bar link system is shown with selectable settings of "soft," "medium," and "firm," corresponding to different levels of telescopic resistance, from low to high resistance. In other embodiments, the selectable settings can be arranged in any order. The terms "soft," "medium," and "firm" used herein are intended as exemplary selectable setting labels and only provide a relative telescopic resistance level setting rather than a specific level of "softness" or "firmness" in the anti-roll bar system. Any other suitable labeling scheme is within the scope of the present disclosure, e.g.: "1," "2," and "3"; "first," "second," and "third"; "A," "B," and "C"; etc. In other embodiments, the control unit can include only two selectable settings (e.g., "soft" and "firm"; "1" and "2"; "first" and "second"; "A" and "B"; etc.) or can include more than three selectable settings with multiple intermediate selectable settings between the softest and firmest setting of the system. As will be described below, the check valves (e.g., the ball check valves described herein) can be replaced with electronic solenoids to control the airflow through the various chambers of the pneumatic control unit. In the embodiments with electronic solenoids, the manual user-selectable settings may be remotely controlled (e.g., by a switch within the passenger compartment of the vehicle), or by the computer control unit of the vehicle. A solenoid may also be used to control the selector lever to switch between settings. In any embodiment with remote control of the system described herein, the settings can be automatically controlled by one or more sensors positioned on the vehicle, e.g., a damper displacement sensor, a vehicle speed sensor, or other sensor. For example, if the system is in the "soft" setting and the vehicle speed exceeds a design threshold, the system can automatically transition to the "medium" or "firm" setting to improve vehicle stability. Similarly, if the system is in the "firm" setting and the vehicle damper encounters a large displacement (e.g., bumpy road), the system can automatically transition to the "medium" or "soft" setting to improve suspension articulation.

Certain details are set forth in the following description and in FIGS. 1-6B to provide a thorough understanding of various embodiments of the present disclosure. In other instances, well-known structures, systems, materials and/or operations often associated with anti-roll bar systems, link assemblies, and associated components are not shown or described in detail in the following disclosure to avoid unnecessarily obscuring the description of the various embodiments of the disclosure. Those of ordinary skill in the art will recognize, however, that embodiments of the present disclosure can be practiced without one or more of the details set forth herein, or with other structures, methods, components, and so forth. The terminology used below is to be interpreted in its broadest reasonable manner, even though it is being used in conjunction with a detailed description of certain examples of embodiments of the present disclosure. Indeed, certain terms may even be emphasized below; however, any terminology intended to be interpreted in any restricted manner will be overtly and specifically defined as such in this Detailed Description section.

The accompanying FIGURES depict embodiments of the present disclosure and are not intended to be limiting of its scope. The sizes of various depicted elements are not necessarily drawn to scale, and these various elements may be arbitrarily enlarged to improve legibility. Component details may be abstracted in the FIGURES to exclude details such as position of components and certain precise connections between such components when such details are unnecessary for a complete understanding of how to make and use the invention. Additionally, many of the details, dimensions, angles and other features shown in the FIGURES are merely illustrative of particular embodiments of the disclosure. Accordingly, other embodiments can have other details, dimensions, angles and features without departing from the spirit or scope of the present disclosure. Those of ordinary skill in the art will also appreciate that further embodiments of the invention can be practiced without several of the details described below. In the FIGURES, identical reference numbers identify identical, or at least generally similar, elements.

Figure 2B:
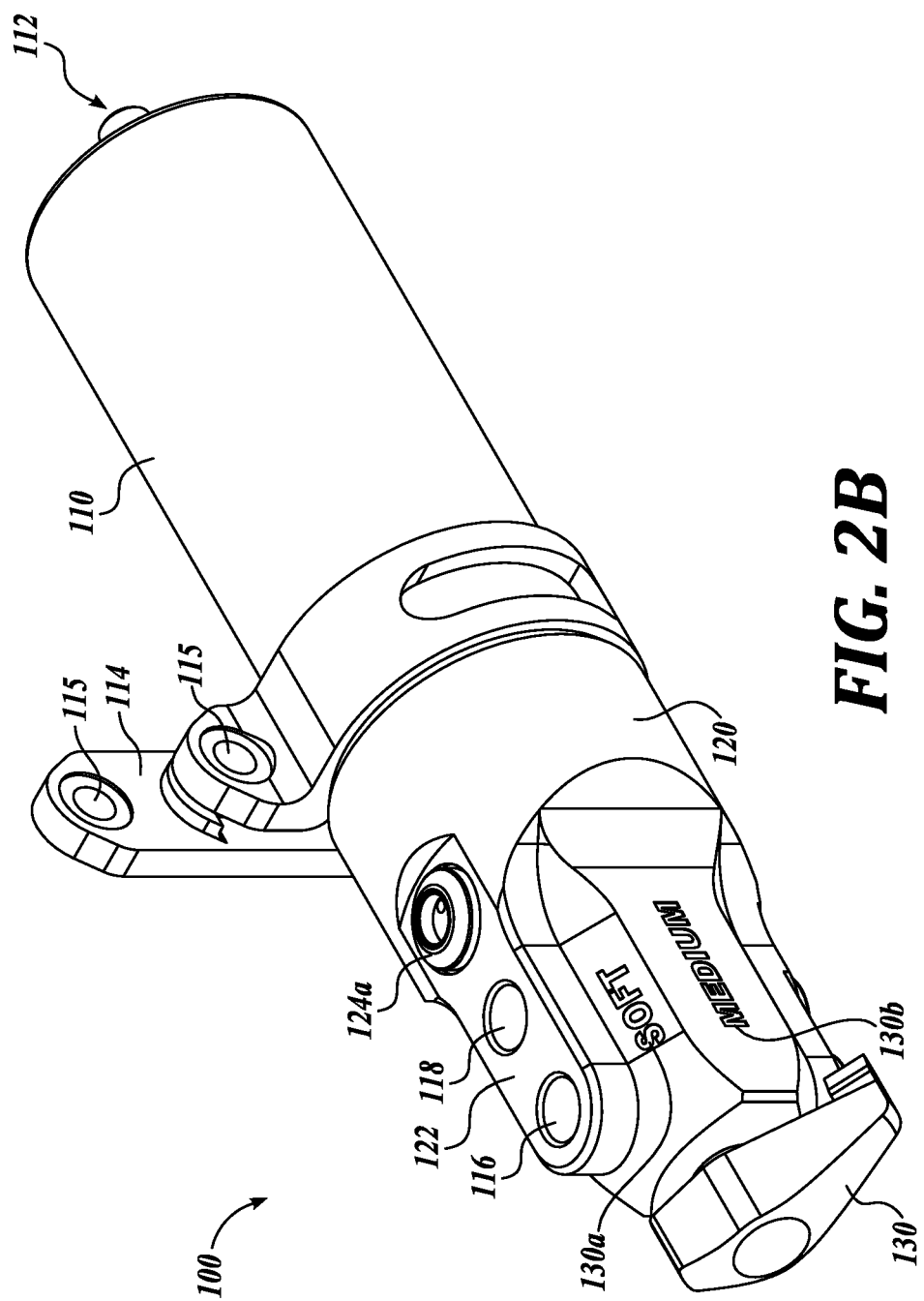

FIGS. 2A and 2B are side and perspective views, respectively, of a pneumatic control unit 100 ("control unit 100") of a dynamic anti-roll bar link system 10 ("system 10," see FIGS. 4A-6B) configured in accordance with embodiments of the present disclosure. The control unit 100 is shown in FIGS. 2A and 2B in a firm selectable setting, corresponding to a high level of telescopic resistance. The selectable setting of the assembly 100 can be adjusted based on the desired stiffness of the anti-roll bar system (e.g., the control unit 100 can be adjusted by rotating a selector lever 130 between selectable settings of "firm," "medium," and "soft"). In the FIGURES, components of the suspension system shown in FIG. 1 are omitted for clarity, with only a portion of which (the system 10 and control unit 100) being shown for discussion purposes.

As shown in FIGS. 2A and 2B, the control unit 100 includes a main chamber body 110 having a fill valve 112 at a distal end. The primary reservoir body 110 can include a mounting bracket 114 having one or more apertures 115 configured to couple the control unit 100 to a mounting surface, e.g., the frame, the firewall, suspension components, or other components of a vehicle. Although a single mounting bracket 114 is shown in the FIGURES, in other embodiments, multiple mounting brackets 114 may be arranged along the primary reservoir body 110 to provide additional support for mounting the control unit 100 to the vehicle. The control unit 100 can further include: a manifold body 120 having a port coupling protrusion 122; a selector lever 130 rotatable between a "soft" setting 130a, a "medium" setting 130b, and a "firm" setting 130c; a first dynamic link port 116 ("first port 116"); and a second dynamic link port 118 ("second port 118"). The first and second dynamic link ports 116 and 118 can be arranged on the port coupling protrusion 122. In some embodiments, the fill valve 112 can be coupled to an air compressor or actuator during use to dynamically control the air pressure within the system 10.

Figure 2C:
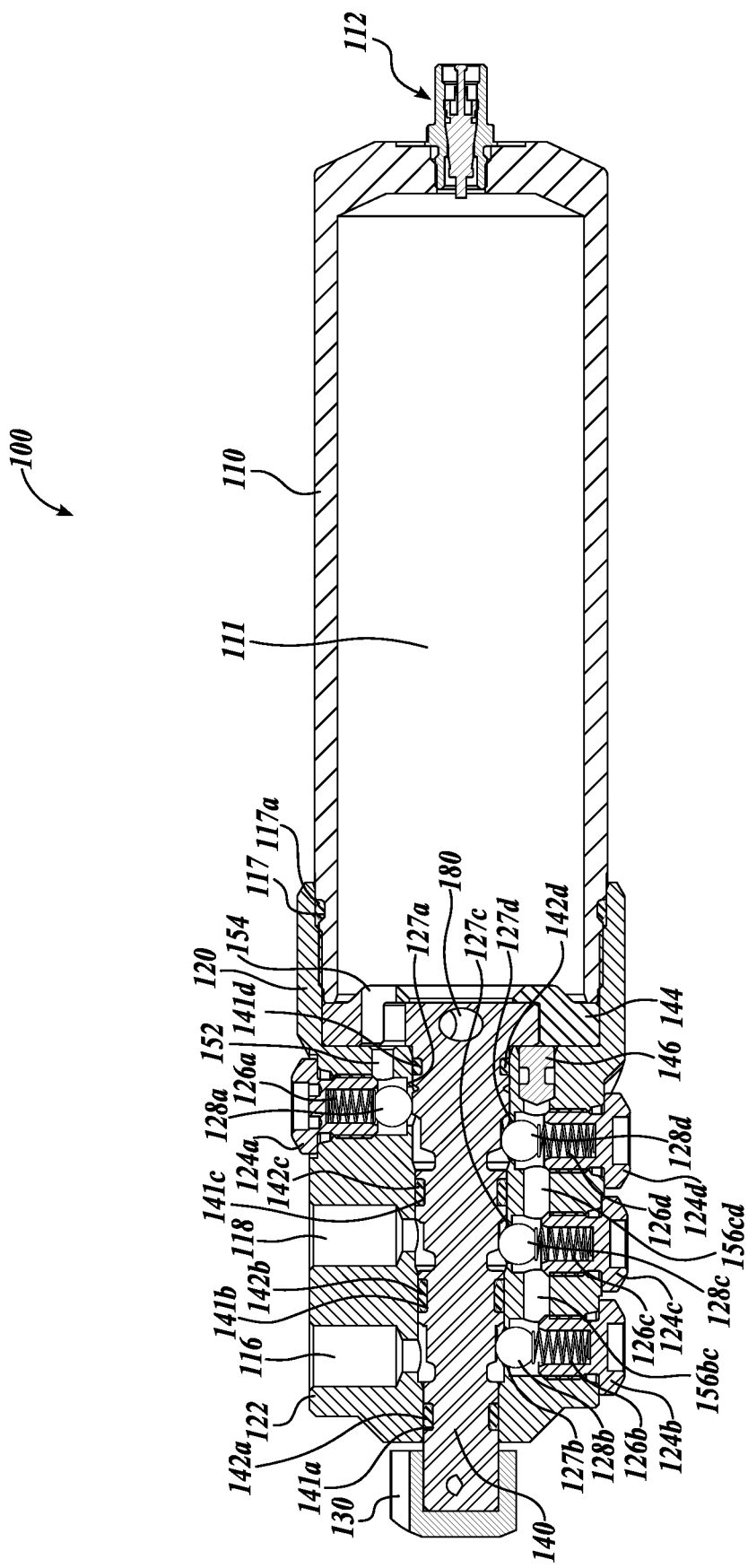
FIGS. 2C and 2D are side cross-sectional and exploded perspective views, respectively, of the control unit of FIGS. 2A and 2B.
Figure 2D:
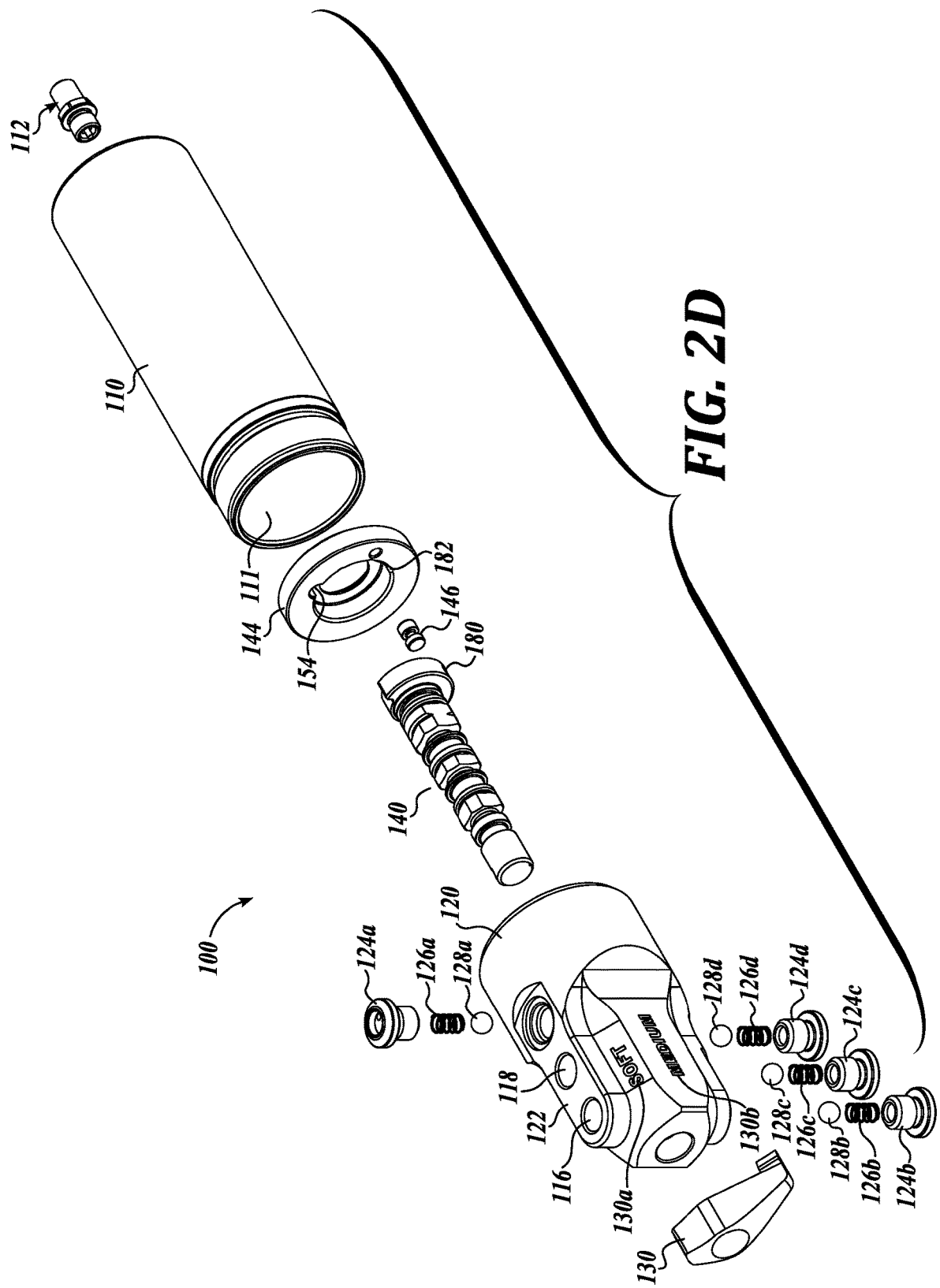

FIGS. 2C and 2D are side cross-sectional and exploded perspective views, respectively, of the control unit 100. As shown in FIG. 2C, the primary reservoir body 110 defines a primary reservoir 111 of the control unit 100. As will be described in detail below, the primary reservoir 111 can be charged with compressed air to various pressures to control the operating pressures in the system 10 that correspond to the desired performance of the dynamic anti-roll bar links in the vehicle. Although not shown, the primary reservoir 111 can include a floating piston that separates the primary reservoir 111 into two chambers to provide increased control of the flow characteristics. The operable coupling of the manifold body 120 to the primary reservoir body 110 can include a body trough 117 having a sealing member 117a (e.g., an o-ring 117a) configured to prevent gases traveling between the atmosphere and the primary reservoir 111. The selector lever 130 can be rotatably coupled to a cam 140 rotatable within the manifold body 120, such that rotation of the selector lever 130 (e.g., between the firm, medium, and soft settings) correspondingly rotates the cam 140. The cam 140 can include various sealing members configured to pneumatically isolate the various cam portions (which will be described below). In this regard, the cam 140 can include a first trough 141a, a second trough 141b, a third trough 141c, and a fourth trough 141d, each configured to receive a sealing member, e.g., an o-ring 142a, 142b, 142c, and 142d, respectively, to pneumatically isolate adjacent cam portions of the cam 140.

The control unit 100 can include various check assemblies that are configured to transition between an open configuration and a checked configuration based on the position of the cam 140. The manifold body 120 can include a plurality of check ports to receive check assemblies. A first check assembly can include a first pocket component 124a, a first check member 128a, a first check sealing surface 127a, and a first biasing element 126a ("biasing spring 126a") that is configured to urge the first check member 128a toward the cam 140. Similarly, second, third, and fourth check assemblies can include second, third, and fourth pocket components 124b, 124d, and 124d; second, third, and fourth check members 128b, 128c, and 128d; second, third, and fourth sealing surfaces 127b, 127c, and 127d; and second, third, and fourth biasing springs 126b, 126c, and 126d that are each configured to urge the second, third, and fourth check members 128b, 128c, 128d, respectively, toward the cam 140. In the illustrated embodiments, the first, second, third, and fourth check members 128a-d are shown as ball check valves, with each of the first, second, third, and fourth biasing springs 126a-d urging the check members 128a-d against the cam 140 such that rotation of the cam 140 selectively translates (as will be describe with respect to FIGS. 3A and 3B) the check members 128a-d toward the pocket components 124a-d. Although the check valves are described herein as including ball check valves (the first, second, third, and fourth check members 128a, 128b, 128c, and 128d), in other embodiments, the check valves can include flat check members (check plates), cylindrical check members (poppets), and/or can be electronically controlled by a solenoid. Further, although the biasing springs are described herein as coil springs (the first, second, third, and fourth biasing springs 126a, 126b, 126c, and 126d), in other embodiments, the biasing element of the check valves can be dampened, such as hydraulically or pneumatically dampened and include a bleed profile to control and smooth the flow through the control unit 100.

Rotation of the cam 140 can have detent features to ensure position of the cam 140 in each of the settings 130a, 130b, and 130c upon rotation of the selector lever 130. In this regard, the detent features can give the user positive feedback when selecting a new setting (e.g., a "click" or centering bias, etc.) to discourage positioning the selector lever 130 between the settings (e.g., between the soft setting 130a and the medium setting 130b). As shown in FIGS. 2C and 2D, the cam 140 can include an aperture 180 configured to receive a detent feature (not shown) therein. The detent feature, such as a biased ball or cone, correspondingly interfaces with detent indentations 182, which can include a separate indentation 182 for each of the settings 130a, 130b, and 130c.

In the configuration of the control unit 100 shown in FIG. 2C, a pneumatic line connected to the first dynamic link port 116 is fluidly connected across the cam 140 to an area surrounding the second check member 128b, which is fluidly connected to an area surrounding the third check member 128c by a passageway 156bc in the manifold body 120. Similarly, a pneumatic line connected to the second dynamic link port 118 is fluidly connected across the cam 140 to an area surrounding the third check member 128c, which is fluidly connected to an area surrounding the fourth check member 128d by a passageway 156cd in the manifold body 120. Adjacent to the area surrounding the fourth check member 128d, a plug 146 can be installed to block the flow of gas from the area surrounding the fourth check member 128d toward the primary reservoir 111. The area surrounding the fourth check member 128d is fluidly connected across the cam 140 to an area surrounding the first check member 128a, which is fluidly connected to the primary reservoir 111 through a primary passageway 152 in the manifold body 120, and through a secondary passageway 154 through a spacer 144 arranged between the manifold body 120 and the primary reservoir body 110. During use, the flow of gas (e.g., air) between the first and second dynamic link ports 116 and 118 and the primary reservoir 111 is controlled by the radial position of the first, second, third, and fourth check members 128a-d based on the rotational position of the cam 140 (e.g., rotation of the selector lever 130 between the firm, medium, and soft settings). Although the control unit 100 is shown in the FIGURES having first, second, third, and fourth check assemblies, in other embodiments any number of check assemblies can be included in the manifold body 120 to control the flow of gas between the first and second dynamic link ports 116 and 118 and the primary reservoir 111.

Figure 3A:
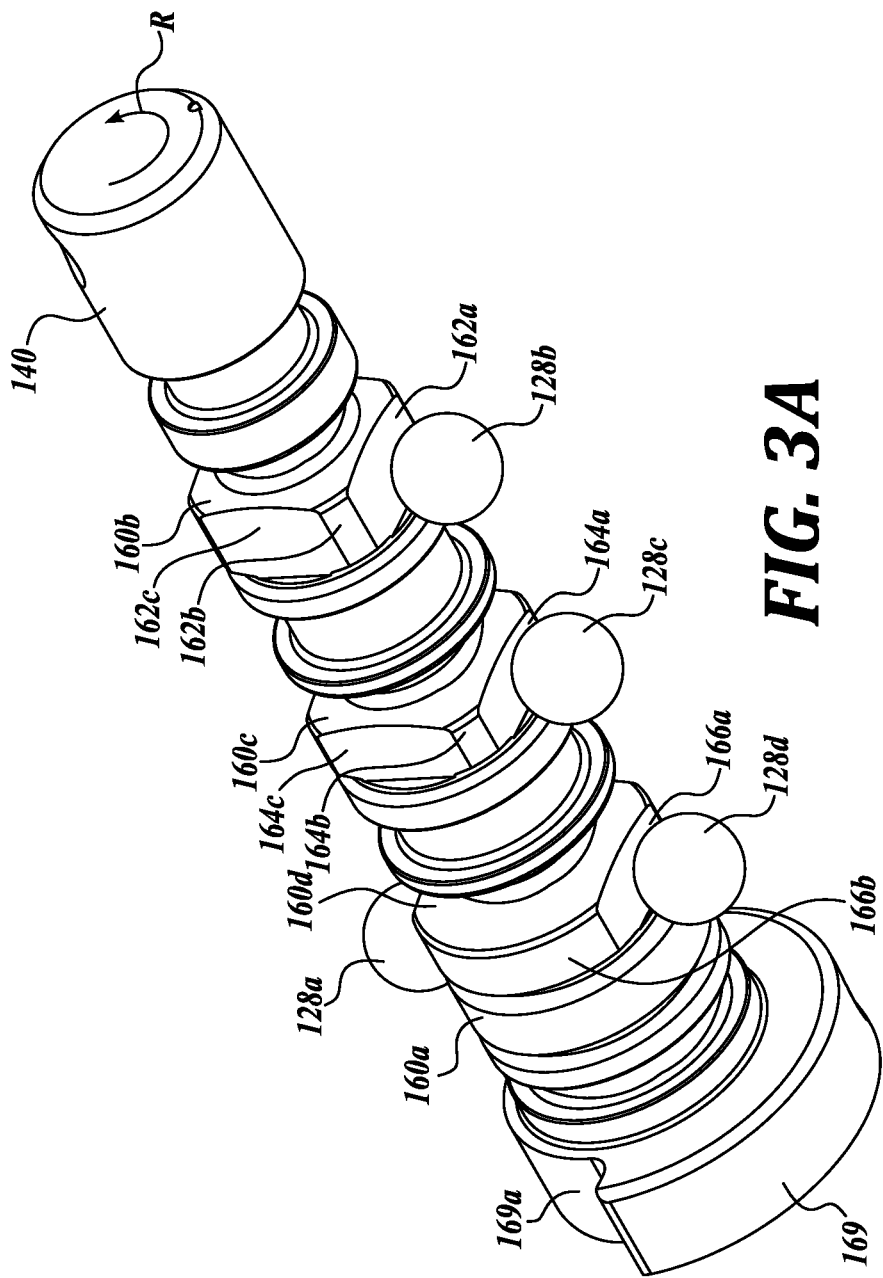
FIGS. 3A and 3B are perspective views of a cam component of the control unit of FIGS. 2A and 2B.
Figure 3B:
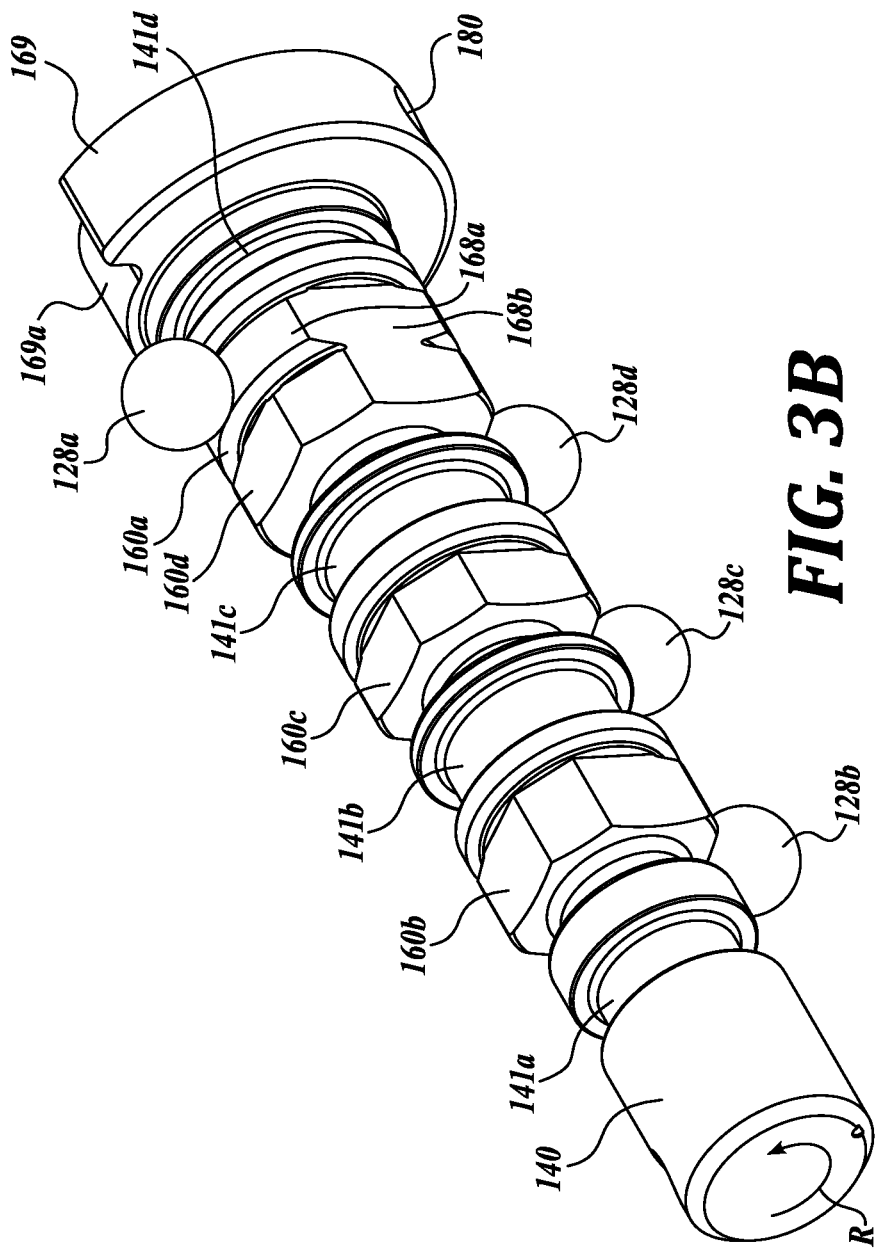

Turning to FIGS. 3A and 3B, the configuration of the cam 140 and the effect of the cam 140 on the check members 128a-d will be described in greater detail. As shown, the cam 140 is positioned in the "firm" setting shown in FIGS. 2A and 2B, with the check members 128a-d against their respective portions of the cam 140. In this regard, the cam 140 can have a first lobe 160a that is configured to interface with the first check member 128a. As shown in FIG. 3B, the first lobe 160a can include an arcuate portion 168a and a flat portion 168b. During use, as the cam 140 rotates from the "firm" setting to the "soft" setting in the direction of the arrow R, the first lobe 160a will rotate such that the first check member 128a will interface with the flat portion 168b.

As will be explained in greater detail below, as the first check member 128a interfaces with the flat portion 168b, the first biasing spring 126a will urge the first check member 128a toward the flat portion 168b away from the first pocket component 124a and against the first sealing surface 127a, effectively closing the first check assembly for checked gas flow. In contrast, when the first check member 128a interfaces with the arcuate portion 168a (e.g., in the "firm" and "medium" settings), the arcuate portion 168a will overcome the force of the first biasing spring 126a and will urge the first check member 128a away from the cam and away from the first sealing surface 127*a*, effectively opening the first check assembly for unchecked gas flow.

Similarly, the cam 140 can have a second lobe 160*b* that is configured to interface with the second check member 128*b*, and includes a first flat portion 162*a*, a raised portion 162*b*, and a second flat portion 162*c*. The cam 140 can have a third lobe 160*c* that is configured to interface with the third check member 128*c*, and includes a first flat portion 164*a*, a raised portion 164*b*, and a second flat portion 164*c*. The cam 140 can have a fourth lobe 160*d* that is configured to interface with the fourth check member 128*d*, and includes a flat portion 166*a* and an arcuate portion 166*b*. During use, as the cam 140 rotates from the "firm" setting to the "soft" setting in the direction of the arrow R, each of the lobes 160*b*-*c* will rotate such that the second, third, and fourth check members 128*b*-*c* will interface different portions of the lobes 160*b*-*c* that correspond to different check states of the first, second, and third check assemblies, e.g., checked or open, as will be described in detail with respect to FIGS. 4A-6B. The cam 140 can include a flanged end 169 opposite the end of the cam 140 configured to operably couple to the selector lever 130. The flanged end 169 can include a rotational stop indentation 169*a* that is configured to limit the rotation of the cam 140 beyond the "soft" and "firm" settings. For example, a dowel pin (not shown) can be operably coupled to the spacer 144 to extend within the rotational stop indentation 169*a* such that rotation of the selector lever 130 is prevented from the "soft" setting in a direction away from the "medium" setting, and rotation of the selector lever 130 is prevented from the "firm" setting in a direction away from the "medium" setting.

Figure 4A:
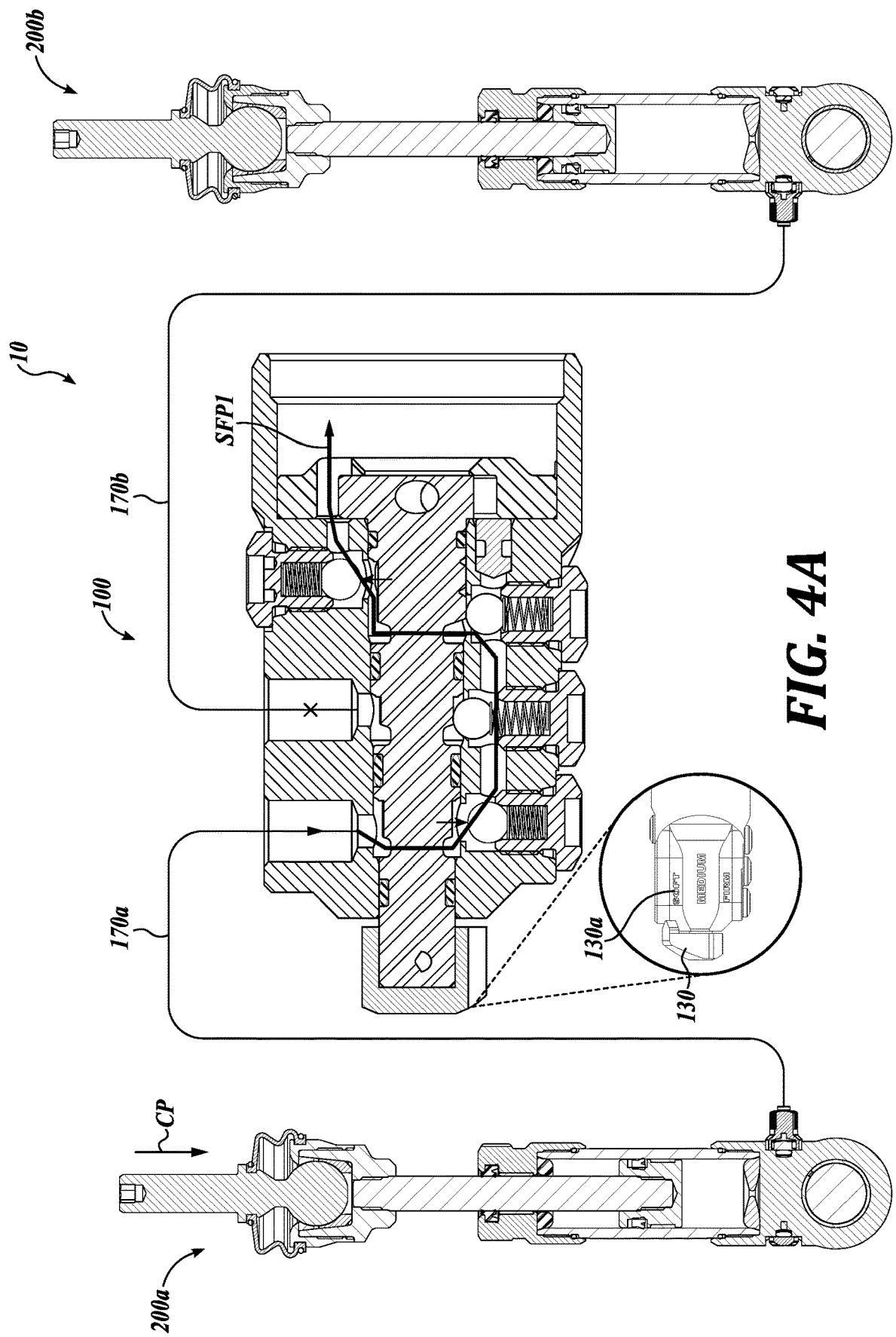
FIGS. 4A-6B are schematic views of operating configurations of a dynamic anti-roll bar link system, including the control unit of FIGS. 2A and 2B, configured in accordance with embodiments of the present disclosure, with FIGS. 4A and 4B showing operation of the system with the control unit in the "soft" setting, FIG. 5 showing operation of the system with the control unit in the "medium" setting, and FIGS. 6A and 6B showing operation of the system with the control unit in the "firm" setting.
Figure 4B:
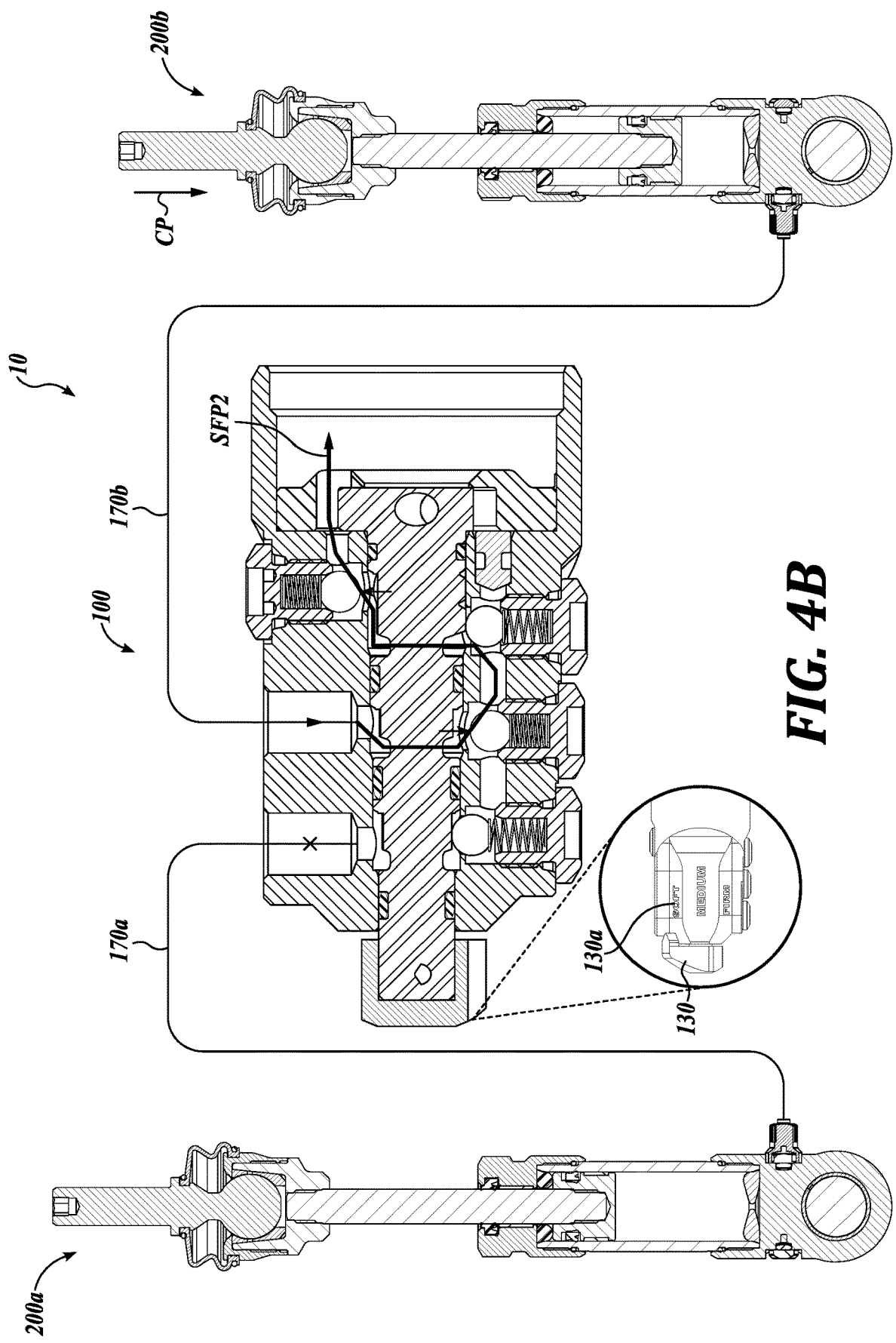
Figure 5:
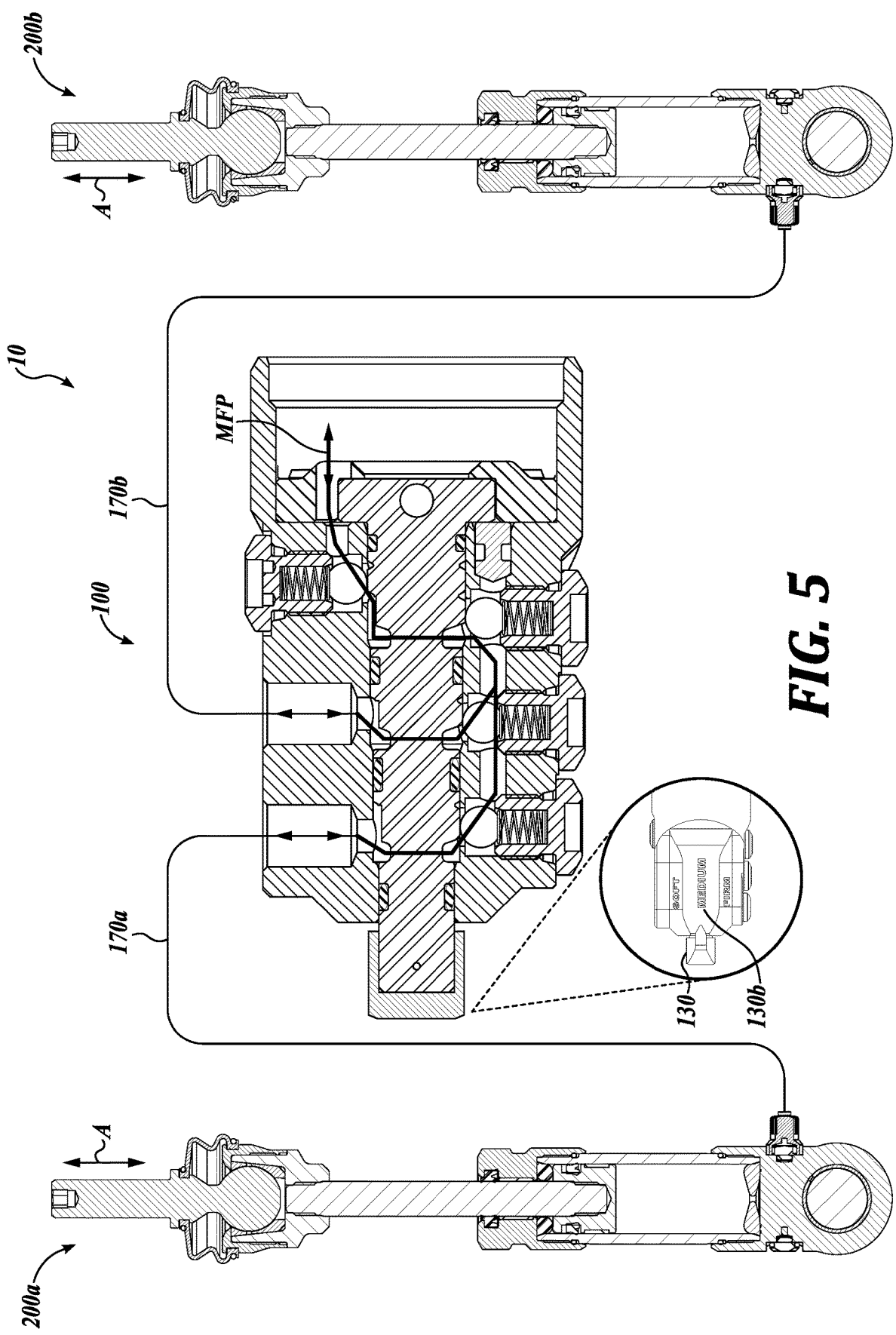
Figure 6A:
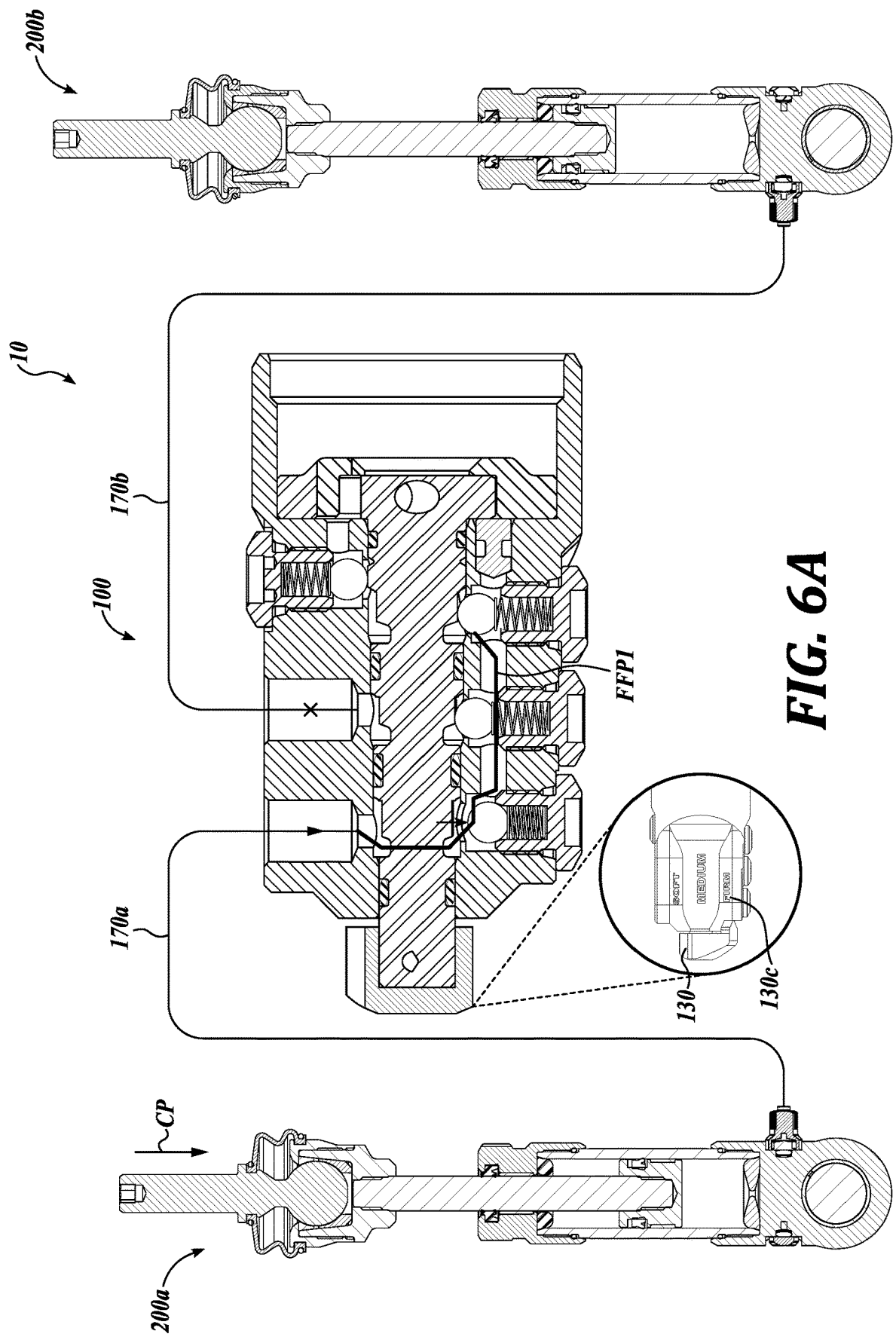
Figure 6B:
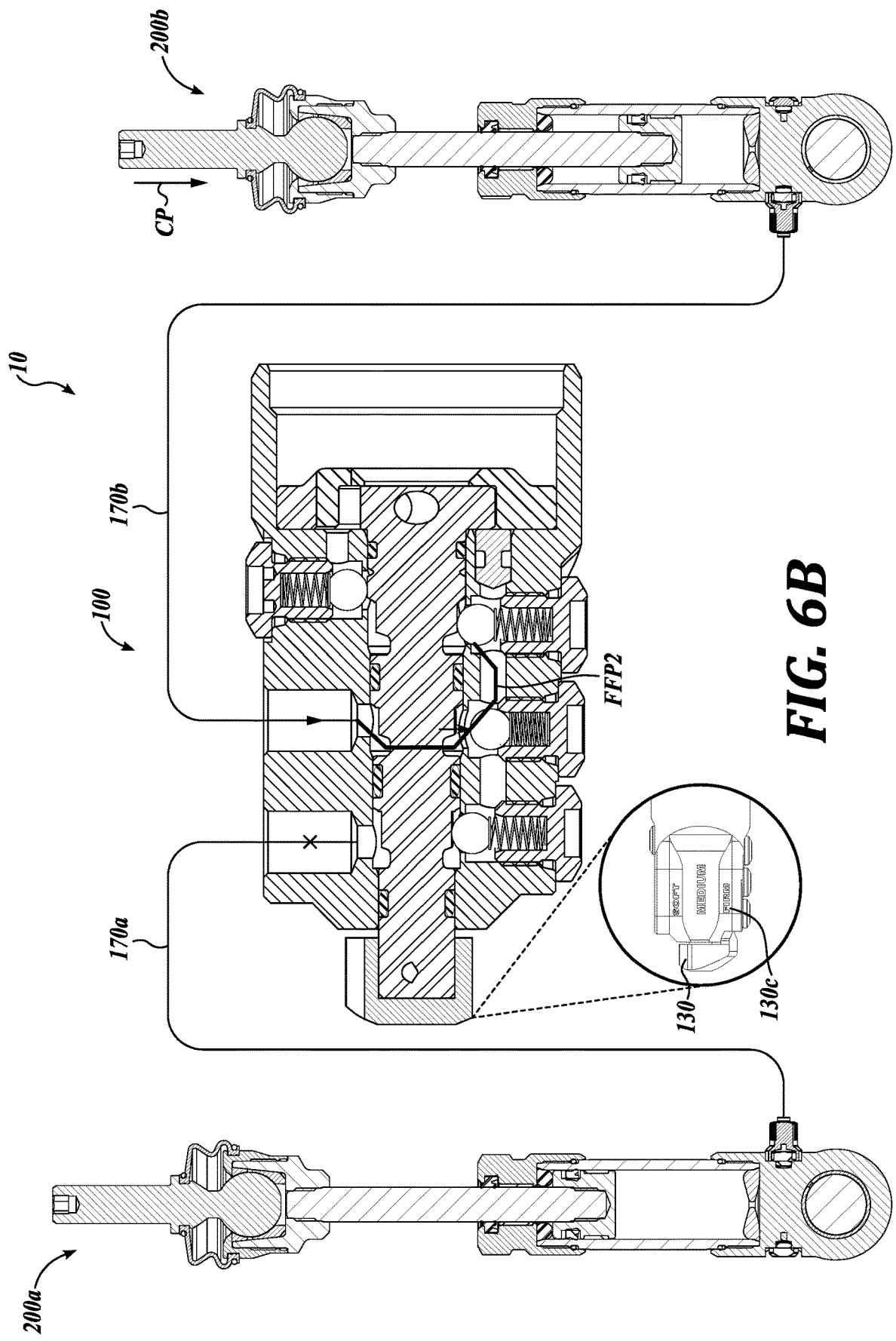

FIGS. 4A-6B show various operating configurations of the system 10 based on the position of the selector lever 130, with FIGS. 4A and 4B showing operation of the system 10 with the control unit 100 in the "soft" setting 130*a*, FIG. 5 showing operation of the system 10 with the control unit 100 in the "medium" setting 130*b*, and FIGS. 6A and 6B showing operation of the system 10 with the control unit 100 in the "firm" setting 130*c*. Referring initially to FIGS. 4A and 4B in conjunction with FIG. 2C, in the "soft" setting 130*a* of the selector lever 130, the system 10 is shown having the control unit 100 pneumatically coupled to a first anti-roll bar link assembly 200*a* and a second anti-roll bar link assembly 200*b*. The first anti-roll bar link assembly 200*a* can be operably coupled to the first dynamic link port 116 of the manifold body 130 by a first line 170*a*, and the second anti-roll bar link assembly 200*b* can be operably coupled to the second dynamic link port 118 of the manifold body 130 by a second line 170*b*. Although the first and second anti-roll bar link assemblies 200*a* and 200*b* are shown with their respective air cylinder push volumes on the side of their pistons opposite the rods, in other embodiments, the air cylinder push volume can be on the rod side of the respective pistons. In further embodiments, the pistons in the first and second anti-roll bar link assemblies 200*a* and 200*b* can include one or more bleed orifices or shimmed check valves that provide gas-damping to the motion of the first and second anti-roll bar link assemblies 200*a* and 200*b*, further smoothing the operation of the system 10.

When the control unit 100 is in the "soft" setting 130*a*, the first lobe 160*a* is rotationally positioned such that the first check member 128*a* interfaces with the flat portion 168*b*, the second lobe 160*b* is rotationally positioned such that the second check member 128*b* interfaces with the second flat portion 162*c*, the third lobe 160*c* is rotationally positioned such that the third check member 128*c* interfaces with the second flat portion 164*c*, and the fourth lobe 160*d* is rotationally positioned such that the fourth check member 128*d* interfaces with the arcuate portion 166*b*. In this configuration, the first check member 128*a* is in a checked position against the first sealing surface 127*a*, the second check member 128*b* is in a checked position against the second sealing surface 127*b*, the third check member 128*c* is in a checked position against the third sealing surface 127*c*, and the fourth check member 128*d* is in an unchecked open position away from the fourth sealing surface 127*d*.

In the configuration shown in FIG. 4A with reference to components of FIG. 2C, with the control unit 100 in the "soft" setting 130*a*, the first anti-roll bar link assembly 200*a* is compressing or compressed, which causes gas to flow from the first anti-roll bar link assembly 200*a* through the first line 170*a* and into the first dynamic link port 116, where the flow will follow a first soft flow path SFP1 in a direction from the first anti-roll bar link assembly 200*a* toward the primary reservoir 111. Pressure from the first anti-roll bar link assembly 200*a* will apply a force to the second check member 128*b* to overcome the second biasing spring 126*b*, moving the second check member 128*b* away from the second sealing surface 127*b*, as shown with an arrow in FIG. 4A. This movement will fluidly connect the first dynamic link port 116 with the passageway 156*bc*, past the third check member 128*c*, and to the passageway 156*cd*. Since the fourth check member 128*d* is an unchecked open position away from the fourth sealing surface 127*d*, gas is permitted to flow across the cam 140 and apply a force to the first check member 128*a* to overcome the first biasing spring 126*a*, moving the first check member 128*a* away from the first sealing surface 127*a*, as shown with an arrow in FIG. 4A, fluidly connecting the first dynamic link port 116 with the primary reservoir 111 through the primary passageway 152 and the secondary passageway 154 along the first soft flow path SFP1. Since the first check member 128*a* is checked in the "soft" setting 130*a*, extension of the first anti-roll bar link assembly 200*a* will not permit gas from the primary reservoir 111 to backflow through the control unit 100 and into the first anti-roll bar link assembly 200*a*. As such, during use, the first anti-roll bar link assembly 200*a* can effectively pump the pressure out of its internal chamber such that the telescopic resistance is minimized, e.g., "soft."

Turning to the configuration shown in FIG. 4B with reference to components of FIG. 2C, with the control unit 100 in the "soft" setting 130*a*, the second anti-roll bar link assembly 200*b* is compressing or compressed, which causes gas to flow from the second anti-roll bar link assembly 200*b* through the second line 170*b* and into the second dynamic link port 118, where the flow will follow a second soft flow path SFP2 in a direction from the second anti-roll bar link assembly 200*b* toward the primary reservoir 111. Pressure from the second anti-roll bar link assembly 200*b* will apply a force to the third check member 128*c* to overcome the third biasing spring 126*c*, moving the third check member 128*c* away from the third sealing surface 127*c*, as shown with an arrow in FIG. 4B. This movement will fluidly connect the third dynamic link port 118 with the passageway 156*cd*. Since the fourth check member 128*d* is an unchecked open position away from the fourth sealing surface 127*d*, gas is permitted to flow across the cam 140 and apply a force to the first check member 128*a* to overcome the first biasing spring 126*a*, moving the first check member 128*a* away from the first sealing surface 127*a*, as shown with an arrow in FIG. 4B, and fluidly connecting the second dynamic link port 118 with the primary reservoir 111 through the primary passageway 152 and the secondary passageway 154 along the second soft flow path SFP2. Since the first check member 128a is checked in the "soft" setting 130a, extension of the second anti-roll bar link assembly 200b will not permit gas from the primary reservoir 111 to backflow through the control unit 100 and into the second anti-roll bar link assembly 200b. As such, during use, the second anti-roll bar link assembly 200b can effectively pump the pressure out of its internal chamber such that the telescopic resistance is minimized, e.g., "soft."

In some embodiments, operation in the "soft" setting 130a can cause a vacuum to form in one or both of the first and second anti-roll bar link assemblies 200a and 200b. In any of the above embodiments related to the "soft" setting 130a, operation of the first and second anti-roll bar link assemblies 200a and 200b have the least amount of telescopic resistance when the control unit 100 is in the "soft" setting, which effectively permits articulation of the vehicle suspension without a corresponding transfer of the articulation into the anti-roll bar through the first and second anti-roll bar link assemblies 200a and 200b. As noted above, the "soft" setting 130a can provide advantages of a substantially disconnected anti-roll bar by increased articulation of the suspension during off-road and other high-articulation uses.

Referring next to FIG. 5 with reference to components of FIG. 2C, in the "medium" setting 130b of the selector lever 130, the system 10 is shown having the control unit 100 pneumatically coupled to the first anti-roll bar link assembly 200a and the second anti-roll bar link assembly 200b. When the control unit 100 is in the "medium" setting 130b, the first lobe 160a is rotationally positioned such that the first check member 128a interfaces with the arcuate portion 168a, the second lobe 160b is rotationally positioned such that the second check member 128b interfaces with the raised portion 162b, the third lobe 160c is rotationally positioned such that the third check member 128c interfaces with the raised portion 164b, and the fourth lobe 160d is rotationally positioned such that the fourth check member 128d interfaces with the arcuate portion 166b. In this configuration, the first check member 128a is in an unchecked open position away from the first sealing surface 127a, the second check member 128b is in an unchecked open position away from the second sealing surface 127b, the third check member 128c is in an unchecked open position away from the third sealing surface 127c, and the fourth check member 128d is in an unchecked open position away from the fourth sealing surface 127d.

In the configuration shown in FIG. 5, with the control unit 100 in the "medium" setting 130b, compression of either the first or second anti-roll bar link assemblies 200a or 200b causes gas to flow from the first or second anti-roll bar link assembly 200a or 200b through the respective first or second line 170a or 170b and into the respective first or second dynamic link port 116 or 118, where the flow will follow a medium flow path MFP in either direction between the anti-roll bar links 200a or 200b and the primary reservoir 111. Pressure from the first and second anti-roll bar link assemblies 200a and 200b will freely flow between the primary reservoir 111 and the other of the first and second anti-roll bar link assemblies 200a and 200b. The "medium" setting 130b fluidly connects the first and second anti-roll bar link assemblies 200a and 200b and the primary reservoir 111, as gases permitted to freely flow between each of the components. As such, during use, the first and second anti-roll bar link assemblies 200a and 200b can have a telescopic resistance that is dictated by the pressure in the system 10 and operates in a manner that is intermediate between the "soft" and "firm" settings 130a and 130c, e.g., "medium."

In some embodiments, operation in the "medium" setting 130b can share gas pressure between both of the first and second anti-roll bar link assemblies 200a and 200b and the primary reservoir 111 along the medium flow path MFP. In any of the above embodiments related to the "medium" setting 130b, operation of the first and second anti-roll bar link assemblies 200a and 200b have an intermediate amount of telescopic resistance when the control unit 100 is in the "soft" setting, which can permit some amount of articulation of the vehicle suspension without a corresponding transfer of the articulation into the anti-roll bar through the first and second anti-roll bar link assemblies 200a and 200b. In this regard, the "medium" setting 130b can provide some of the advantages of a substantially disconnected anti-roll bar by increased articulation of the suspension during off-road and other high-articulation uses, while also providing stability of a connected anti-roll bar during high-speed use.

Referring finally to FIGS. 6A and 6B with reference to components of FIG. 2C, in the "firm" setting 130c of the selector lever 130, the system 10 is shown having the control unit 100 pneumatically coupled to a first anti-roll bar link assembly 200a and a second anti-roll bar link assembly 200b. When the control unit 100 is in the "firm" setting 130c, the first lobe 160a is rotationally positioned such that the first check member 128a interfaces with the arcuate portion 168a, the second lobe 160b is rotationally positioned such that the second check member 128b interfaces with the first flat portion 162a, the third lobe 160c is rotationally positioned such that the third check member 128c interfaces with the first flat portion 164a, and the fourth lobe 160d is rotationally positioned such that the fourth check member 128d interfaces with the flat portion 166a. In this configuration, the first check member 128a is in an unchecked open position away from the first sealing surface 127a, the second check member 128b is in a checked position against the second sealing surface 127b, the third check member 128c is in a checked position against the third sealing surface 127c, and the fourth check member 128d is in a checked position against the fourth sealing surface 127d.

In the configuration shown in FIG. 6A, with the control unit 100 in the "firm" setting 130c, the first anti-roll bar link assembly 200a is compressing or compressed, which causes gas to flow from the first anti-roll bar link assembly 200a through the first line 170a and into the first dynamic link port 116, where the flow will follow a first firm flow path FFP1. Pressure from the first anti-roll bar link assembly 200a will apply a force to the second check member 128b to overcome the second biasing spring 126b, moving the second check member 128b away from the second sealing surface 127b, as shown with an arrow in FIG. 6A. This movement will fluidly connect the first dynamic link port 116 with the passageway 156bc, past the third check member 128c, and to the passageway 156cd along the first firm flow path FFP1; however, the fourth check member 128d is checked so the gas flow is not permitted to flow across the cam 140 to the first check member 128a. In this regard, the first anti-roll bar assembly 200a cannot be fluidly connected to the primary reservoir 111 in the "firm" setting 130c. As such, gas is effectively not permitted to flow out of the first anti-roll bar link assembly 200a or into the second anti-roll bar link assembly 200b, resulting in the maximum telescopic resistance of the first anti-roll bar assembly 200a.

Turning to the configuration shown in FIG. 6B, with the control unit 100 in the "firm" setting 130c, the second anti-roll bar link assembly 200b is compressing or compressed, which causes gas to flow from the second anti-roll bar link assembly 200b through the second line 170b and into the second dynamic link port 118, where the flow will follow a second firm flow path FFP2. Pressure from the second anti-roll bar link assembly 200b will apply a force to the third check member 128c to overcome the third biasing spring 126c, moving the third check member 128c away from the third sealing surface 127c, as shown with an arrow in FIG. 6B. This movement will fluidly connect the second dynamic link port 118 with the passageway 156cd; however, the fourth check member 128d is checked so the gas flow is not permitted to flow across the cam 140 to the first check member 128a. In this regard, the second anti-roll bar assembly 200b cannot be fluidly connected to the primary reservoir 111 in the "firm" setting 130c. As such, gas is effectively not permitted to flow out of the second anti-roll bar link assembly 200b or into the first anti-roll bar link assembly 200a, resulting in the maximum telescopic resistance of the second anti-roll bar assembly 200b.

In any of the above embodiments related to the "firm" setting 130c, operation of the first and second anti-roll bar link assemblies 200a and 200b have the greatest amount of telescopic resistance when the control unit 100 is in the "firm" setting, which effectively transfers articulation of the vehicle suspension to articulation into the anti-roll bar through the first and second anti-roll bar link assemblies 200a and 200b. As noted above, the "firm" setting 130c can provide stability advantages of a substantially fixed-link anti-roll bar by transferring articulation of the suspension to the anti-roll bar for stability during high-speed use of the vehicle.

As described above, the fourth check member 128d is held open in the "soft" and "medium" settings 130a and 130b. As such, in alternate embodiments, the fourth check member 128d may be omitted in configurations of the control unit 100 that do not include a "firm" setting, leaving the check valve open. Further, in other embodiments, the first and/or second lines 170a and/or 170b can include a valve to close flow between the first and second anti-roll bar link assemblies 200a and 200b and the control unit 100. This valve can include a check feature such that flow is permitted in one direction and stopped in the other direction.

During charging (e.g., pressurization) of the system 10, positioning the control unit 100 in the "medium" setting 130b can permit gas to flow from the primary reservoir 111 and into the first and second anti-roll bar link assemblies 200a and 200b, as all of the check valves are held open in the "medium" setting 130b. This configuration would ensure a consistent pressure throughout the primary reservoir 111, the lines 170a and 170b, and the first and second anti-roll bar link assemblies 200a and 200b. However, in other embodiments, the system 10 can be charged when positioned in other settings, such as when the primary reservoir 111 has a volume that is significantly greater than the volumes in the first and second anti-roll bar link assemblies 200a and 200b. When the system 10 is discharged, the first and second anti-roll bar link assemblies 200a and 200b can act as standard air dampers to provide damped articulation of the suspension with decreased load transfer to the anti-roll bar link.

In further embodiments, the control unit 100 can be omitted and replaced by a pneumatic valve (not shown) positioned along pneumatic coupling lines (similar to the lines 170a and 170b) intermediately between the first and second anti-roll bar link assemblies 200a and 200b, with the pneumatic valve having a closed position corresponding to a firmer setting, and an open position corresponding to a softer setting. In these embodiments, when the pneumatic valve is in the closed position, gas compressed in the first anti-roll bar link assembly 200a would not be permitted to travel through the pneumatic valve and pressurize the second anti-roll bar link assembly 200b, which is similar in result to the configuration shown in FIGS. 6A and 6B. When the pneumatic valve is in the open position, gas compressed in the first anti-roll bar link assembly 200a would be permitted to travel through the valve and pressurize the second anti-roll bar link assembly 200b, which is similar in result to the configuration shown in FIGS. 4A and 4B, except without the expansion capacity of the primary reservoir 111. Although the pneumatic valve embodiments have an open/close pneumatic valve that is not shown in the FIGURES, the schematic is similar to that shown in FIGS. 6A and 6B, with the control unit 100 replaced by the open/close pneumatic valve. In these embodiments, the open/close pneumatic valve can be manually operated, electronically operated (e.g., by a solenoid), or automatically operated by a control system of the vehicle (e.g., with sensors related to suspension travel opening the pneumatic valve to provide softer anti-roll bar effect/compliance).

Although embodiments are shown for use with an automotive suspension system for purposes of the present disclosure, the pneumatic control for dynamic anti-roll bar link systems described herein can be used with any suitable type of suspension system, e.g., heavy equipment suspension, tractor suspension, forklift suspension, etc. Accordingly, the various embodiments of the present technology described herein are not limited to use with a particular configuration.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., gas, air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

The embodiments of the invention in which an exclusive property or privilege is claimed are defined as follows:

1. A control unit for an anti-roll bar link system for a vehicle suspension, the control unit comprising:
    a manifold body, having:
        a central opening extending through the manifold body;
        a first port extending through the manifold body into the central opening, the first port configured to fluidly couple the central opening to a first anti-roll bar link assembly;
        a second port extending through the manifold body into the central opening, the second port configured to fluidly couple the central opening to a second anti-roll bar link assembly; and
        a plurality of check ports extending into the central opening;
    a reservoir coupled to the manifold body and in fluid communication with the central opening;
    a cam received within the central opening and rotatable with respect to the manifold body, the cam being positionable between at least a first setting and second setting of the control unit, the second setting causing greater telescopic resistance within the first and second anti-roll bar link assemblies than the first setting;
    a first check assembly extending through one of the plurality of check ports and having a first check member configured to selectively abut a first check sealing surface of the manifold body based on the position of the cam;
    a second check assembly extending through another one of the plurality of check ports and having a second check member configured to selectively abut a second check sealing surface of the manifold body based on the position of the cam, wherein the second check sealing surface is in fluid communication with the first port; and
    a third check assembly extending through another one of the plurality of check ports and having a third check member configured to selectively abut a third check sealing surface of the manifold body based on the position of the cam, wherein the third check sealing surface is in fluid communication with the second port,
    wherein, when the cam is positioned in the first setting:
        the first, second, and third check members abut the first, second, and third check sealing surfaces, respectively;
        pressure entering the first port from the first anti-roll bar link assembly causes the first and second check members to permit fluid flow from the first anti-roll bar link assembly to the reservoir; and
        pressure entering the second port from the second anti-roll bar link assembly causes the first and third check members to permit flow from the second anti-roll bar link assembly to the reservoir, and
    wherein, when the cam is positioned in the second setting, the first, second, and third check members are positioned away from the first, second, and third check sealing surfaces, respectively, such that the first and second anti-roll bar link assemblies and the reservoir are in fluid communication with each other.

2. The control unit of claim 1, further comprising a fourth check assembly extending through another one of the plurality of check ports and having a fourth check member configured to selectively abut a fourth check sealing surface of the manifold body based on the position of the cam, wherein the fourth check sealing surface is positioned to selectively stop fluid flow between the first check assembly and the second and third check assemblies, wherein, when the cam is in the first and second setting positions, the fourth check member is positioned away from the fourth check sealing surface to permit fluid flow between the first check assembly and the second and third check assemblies.

3. The control unit of claim 2, wherein the cam is further positionable at a third setting causing greater telescopic resistance within the first and second anti-roll bar link assemblies than the first and second settings, wherein, when the cam is positioned in the third setting:

the second, third, and fourth check members abut the second, third, and fourth check sealing surfaces, respectively;

pressure entering the first port from the first anti-roll bar link assembly causes the second check member to permit fluid flow from the first anti-roll bar link assembly until fluid flow is stopped at the fourth check assembly; and pressure entering the second port from the second anti-roll bar link assembly causes the third check member to permit fluid flow from the second anti-roll bar link assembly until fluid flow is stopped at the fourth check assembly.

4. The control unit of claim 3, wherein, when the cam is positioned in the third setting, the fourth check member breaks fluid communication between the first and second anti-roll bar link assemblies and the reservoir.

5. The control unit of claim 3, wherein the cam comprises:

a first lobe positioned to interface with the first check member and selectively position the first check member away from the first check sealing surface when the cam is positioned in the second or third settings;

a second lobe positioned to interface with the second check member and position the second check member away from the first check sealing surface when the cam is positioned in the second setting;

a third lobe positioned to interface with the third check member and selectively position the third check member away from the third check sealing surface when the cam is positioned in the second setting; and a fourth lobe positioned to interface with the fourth check member and selectively position the fourth check member away from the third check sealing surface when the cam is positioned in the first or second settings.

6. The control unit of claim 2, wherein the first, second, third, and fourth check assemblies each comprise a pocket component having a biasing element that urges the first, second, third, and fourth check members toward the first, second, third, fourth check sealing surfaces, respectively, and wherein the biasing element is a spring, a hydraulic biasing element, or a pneumatic biasing element.

7. The control unit of claim 1, wherein the first, second, and third check assemblies each comprise a pocket component having a biasing element that urges the first, second, and third check members toward the first, second, and third check sealing surfaces, respectively.

8. The control unit of claim 7, wherein the biasing element is a spring, a hydraulic biasing element, or a pneumatic biasing element.

9. The control unit of claim 1, wherein the cam comprises:

a first lobe positioned to interface with the first check member and selectively position the first check member away from the first check sealing surface when the cam is positioned in the second setting;

a second lobe positioned to interface with the second check member and position the second check member away from the second check sealing surface when the cam is positioned in the second setting; and a third lobe positioned to interface with the third check member and selectively position the third check member away from the third check sealing surface when the cam is positioned in the second setting.

10. The control unit of claim 1, wherein the cam has a selector lever configured to permit rotation of the cam between the first and second settings.

11. The control unit of claim 1, wherein the cam comprises a plurality of annular troughs configured to receive a sealing member therein, wherein a first annular trough of the plurality of annular troughs is positioned along the cam between the first port and the second port, wherein a second annular trough of the plurality of annular troughs is positioned along the cam between the second port and the first check assembly, and wherein a third annular trough of the plurality of annular troughs is positioned along the cam between the first check assembly and the reservoir.

12. The control unit of claim 1, wherein one or more of the first, second, and third check members is electronically positionable relative to its respective check sealing surface.

13. The control unit of claim 1, wherein the cam is manually operated between the first and second settings, electronically operated between the first and second settings, or automatically operated between the first and second settings by the vehicle suspension.

14. The control unit of claim 1, wherein the cam is automatically operated between the first and second settings by the vehicle suspension, and wherein, when suspension travel increases beyond a threshold, the vehicle suspension positions the cam in the first setting to provide a softer setting of the vehicle suspension than the second setting.

15. The control unit of claim 1, wherein the cam is automatically operated between the first and second settings by the vehicle suspension, and wherein, when a vehicle speed increases beyond a threshold, the vehicle suspension positions the cam in the second setting to provide a firmer setting of the vehicle suspension than the first setting.

16. An anti-roll bar link system for a vehicle suspension, the system comprising:

a first anti-roll bar link assembly;

a second anti-roll bar link assembly; and a control unit fluidly coupled between the first and second anti-roll bar link assemblies, the control unit having:

a manifold body having a central opening extending through the manifold body, a first port fluidly coupling the central opening to the first anti-roll bar link assembly, and a second port fluidly coupling the central opening to the second anti-roll bar link assembly;

a cam received within the central opening and rotatable with respect to the manifold body, the cam being positionable between at least a first setting and second setting of the control unit, the second setting causing greater telescopic resistance within the first and second anti-roll bar link assemblies than the first setting;
a first check member configured to selectively abut a first check sealing surface of the manifold body based on the position of the cam;
a second check member configured to selectively abut a second check sealing surface of the manifold body based on the position of the cam, wherein the second check sealing surface is in fluid communication with the first port; and
a third check member configured to selectively abut a third check sealing surface of the manifold body based on the position of the cam, wherein the third check sealing surface is in fluid communication with the second port,
wherein, when the cam is positioned in the first setting:
the first, second, and third check members abut the first, second, and third check sealing surfaces, respectively;
compressing the first anti-roll bar link assembly pressurizes the first port and causes the first and second check members to permit fluid flow from the first anti-roll bar link assembly past the first check member; and
compressing the second anti-roll bar link assembly pressurizes the second port and causes the first and third check members to permit flow from the second anti-roll bar link assembly past the first check member, and
wherein, when the cam is positioned in the second setting, the first, second, and third check members are positioned away from the first, second, and third check sealing surfaces, respectively, such that the first and second anti-roll bar link assemblies are in fluid communication with each other.

17. The system of claim 16, wherein the control unit further comprises a reservoir coupled to the manifold body and in fluid communication with the central opening, wherein when the cam is positioned in the first setting, fluid flow is permitted from the first anti-roll bar link assembly to the reservoir, and wherein when the cam is positioned in the first setting, fluid flow is permitted from the second anti-roll bar link assembly to the reservoir.

18. The system of claim 17, wherein the cam comprises a plurality of annular troughs configured to receive a sealing member therein, wherein a first annular trough of the plurality of annular troughs is positioned along the cam between the first port and the second port, wherein a second annular trough of the plurality of annular troughs is positioned along the cam between the second port and the first check member, and wherein a third annular trough of the plurality of annular troughs is positioned along the cam between the first check member and the reservoir.

19. The system of claim 16, further comprising a fourth check member configured to selectively abut a fourth check sealing surface of the manifold body based on the position of the cam, wherein the fourth check sealing surface is positioned to selectively stop fluid flow between the first check assembly and the second and third check members,
wherein, when the cam is in the first and second setting positions, the fourth check member is positioned away from the fourth check sealing surface to permit fluid flow between the first check assembly and the second and third check members.

20. The system of claim 19, wherein the cam is further positionable at a third setting causing greater telescopic resistance within the first and second anti-roll bar link assemblies than the first and second settings, wherein, when the cam is positioned in the third setting:
the second, third, and fourth check members abut the second, third, and fourth check sealing surfaces, respectively;
pressure entering the first port from the first anti-roll bar link assembly causes the second check member to permit fluid flow from the first anti-roll bar link assembly until fluid flow is stopped at the fourth check assembly prior to reaching the first check member; and
pressure entering the second port from the second anti-roll bar link assembly causes the third check member to permit fluid flow from the second anti-roll bar link assembly until fluid flow is stopped at the fourth check assembly prior to reaching the first check member.

21. The system of claim 20, wherein, when the cam is positioned in the third setting, the fourth check member breaks fluid communication between the first and second anti-roll bar link assemblies and the reservoir.

22. The system of claim 20, wherein the cam comprises:
a first lobe positioned to interface with the first check member and selectively position the first check member away from the first check sealing surface when the cam is positioned in the second or third settings;
a second lobe positioned to interface with the second check member and position the second check member away from the first check sealing surface when the cam is positioned in the second setting;
a third lobe positioned to interface with the third check member and selectively position the third check member away from the third check sealing surface when the cam is positioned in the second setting; and
a fourth lobe positioned to interface with the fourth check member and selectively position the fourth check member away from the third check sealing surface when the cam is positioned in the first or second settings.

23. The system of claim 19, wherein the first, second, third, and fourth check members are positioned adjacent to a respective check pocket component having a biasing element that urges the first, second, third, and fourth check members toward the first, second, third, fourth check sealing surfaces, respectively, and wherein the biasing element is a spring, a hydraulic biasing element, or a pneumatic biasing element.

24. The system of claim 16, wherein the first, second, and third check assemblies each comprise a pocket component having a biasing element that urges the first, second, and third check members toward the first, second, and third check sealing surfaces, respectively.

25. The system of claim 24, wherein the biasing element is a spring, a hydraulic biasing element, or a pneumatic biasing element.

26. The system of claim 16, wherein the cam comprises:
a first lobe positioned to interface with the first check member and selectively position the first check member away from the first check sealing surface when the cam is positioned in the second setting;
a second lobe positioned to interface with the second check member and position the second check member away from the first check sealing surface when the cam is positioned in the second setting; and
a third lobe positioned to interface with the third check member and selectively position the third check member away from the third check sealing surface when the cam is positioned in the second setting.

27. The system of claim 16, wherein the cam has a selector lever configured to permit rotation of the cam between the first and second settings.

28. The system of claim 16, wherein one or more of the first, second, and third check members is electronically positionable relative to its respective check sealing surface.

29. The system of claim 16, wherein the cam is automatically operated between the first and second settings by the vehicle suspension, and wherein, when suspension travel increases beyond a threshold, the vehicle suspension positions the cam in the first setting to provide a softer setting of the vehicle suspension than the second setting.

30. The system of claim 16, wherein the cam is automatically operated between the first and second settings by the vehicle suspension, and wherein, when a vehicle speed increases beyond a threshold, the vehicle suspension positions the cam in the second setting to provide a firmer setting of the vehicle suspension than the first setting.

* * * * *